United States Patent
O'Connor et al.

(10) Patent No.: US 7,039,763 B2
(45) Date of Patent: May 2, 2006

(54) APPARATUS AND METHOD TO SHARE A CACHE MEMORY

(75) Inventors: Dennis M. O'Connor, Chandler, AZ (US); Michael W. Morrow, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 479 days.

(21) Appl. No.: 10/411,725

(22) Filed: Apr. 11, 2003

(65) Prior Publication Data

US 2004/0205295 A1    Oct. 14, 2004

(51) Int. Cl.
*G06F 12/00* (2006.01)
(52) U.S. Cl. ........................ 711/129; 711/130
(58) Field of Classification Search ............... None
See application file for complete search history.

(56) References Cited

U.S. PATENT DOCUMENTS

| | | | | |
|---|---|---|---|---|
| 5,875,464 A | * | 2/1999 | Kirk | 711/129 |
| 5,898,883 A | * | 4/1999 | Fujii et al. | 712/28 |
| 6,480,941 B1 | * | 11/2002 | Franke et al. | 711/153 |
| 6,804,753 B1 | * | 10/2004 | Moody et al. | 711/163 |
| 2002/0010844 A1 | * | 1/2002 | Noel et al. | 711/153 |
| 2004/0098552 A1 | * | 5/2004 | Kadi | 711/169 |

OTHER PUBLICATIONS

John L. Hennessy et al., "Computer Architecture a Quantitative Approach", Morgan Kaufman Publishing, 1990, pps 408-414.

* cited by examiner

*Primary Examiner*—Matthew D. Anderson
(74) *Attorney, Agent, or Firm*—John F. Travis

(57) ABSTRACT

Briefly, in accordance with an embodiment of the invention, an apparatus and method to share a cache memory is provided. The method may include dynamically partitioning a cache memory to cache data for one or more active clients during operation of the cache memory, wherein the number of active clients varies during operation of the cache memory. The apparatus may include a control device coupled to a cache memory to dynamically partition the cache memory.

27 Claims, 3 Drawing Sheets

APPARATUS AND METHOD TO SHARE A CACHE MEMORY

BACKGROUND

Computing systems may include various types of memory devices having various access times. For example, a computing system may include a relatively slower memory for long term storage and a relatively faster memory to cache data.

Several methods exist for determining which information to store in the cache memory. A cache memory may store recently used data in a relatively faster cache memory. Accessing of recently used data from a relatively faster cache memory as opposed to accessing this information from a relatively slower memory may improve system performance.

Determining the appropriate methods and apparatuses for caching data for a particular system involves many factors. System designers are continually searching for alternate ways to cache data to improve system performance.

BRIEF DESCRIPTION OF THE DRAWINGS

The subject matter regarded as the invention is particularly pointed out and distinctly claimed in the concluding portion of the specification. The present invention, however, both as to organization and method of operation, together with objects, features, and advantages thereof, may best be understood by reference to the following detailed description when read with the accompanying drawings in which:

Figure 1:
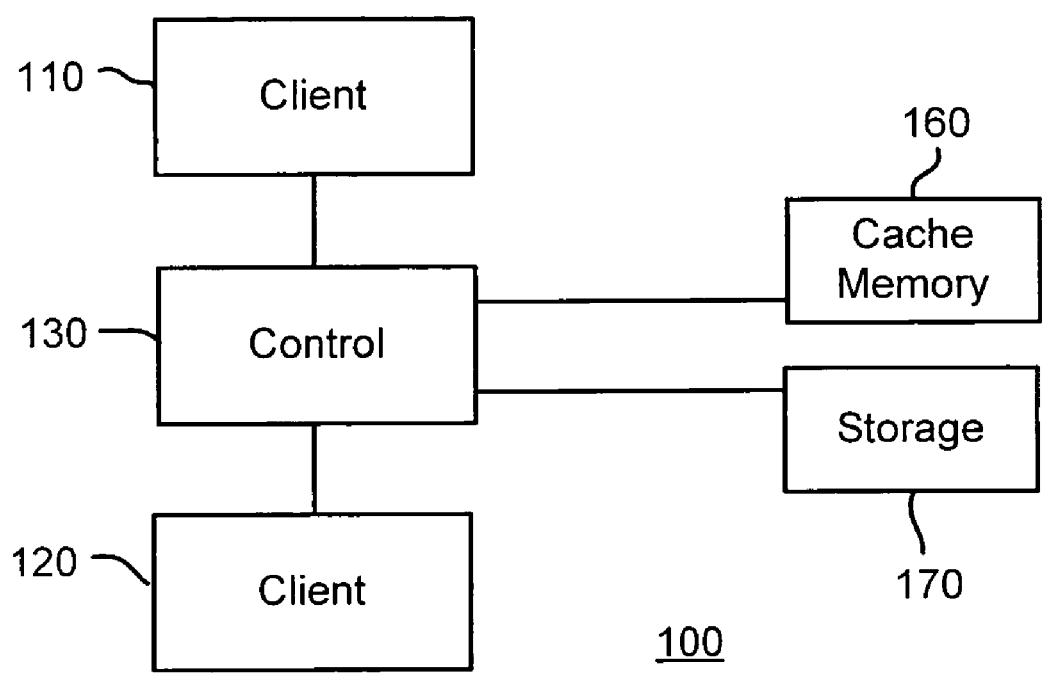
FIG. 1 is a block diagram illustrating a computing system in accordance with an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the present invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Turning to FIG. 1, an embodiment of a portion of a computing system 100 is illustrated. System 100 may comprise clients 110 and 120, a control 130, a cache memory 160, and a storage device 170.

Clients 110 and 120 may be transaction initiators such as, for example, microprocessors, digital signal processors, microcontrollers, or the like. In addition, software executed by a processor such as, for example, tasks or threads, may be transaction initiators. A thread or task may be executed by a single processor, or in some embodiments, multiple threads or tasks may be executed by a single processor or multiple processors.

In one embodiment, clients 110 and 120 may share use of cache memory 160. For example, clients 110 and 120 may each be a processor sharing use of cache memory 160. In another example, clients 110 and 120 may each be a thread or task sharing use of cache memory 160.

Control 130 may be comprised of digital logic and may also be referred to as control logic or a control device. In one embodiment, control 130 may be coupled by a bus, or more than one bus, to cache memory 160, storage device 170, and clients 110 and 120. A bus may be a data path comprising, for example, a collection of data lines to transmit data from one part of computing system 100 to another. In one example, control 130 may be a memory controller.

Generally, control 130 may control transfer of data between clients 110 and 120 and cache memory 160 and storage 170. In one embodiment, control 130 may be integrated ("on-chip") with other components of computing system 100. In another embodiment, control 130 may be a discrete device that is external ("off-chip") to other components of computing system 100. In yet another embodiment, portions of the functionality of control 130 may be implemented in software, e.g., as part of an operation system or as a software application, module, procedure, or routine.

In some embodiments, cache memory 160 and storage device 170 may be adapted to store instructions, such as, for example, instructions for an operating system or a software program that may be executed by a processor. In addition, cache memory 160 and storage device 170 may also store data that is accessed by these instructions. In the following description and claims, the term "data" may be used to refer to both data and instructions. In addition, the term "information" may be used to refer to data and instructions.

Cache memory 160 may be a relatively faster memory device compared to storage device 170, i.e., the access time of cache memory 160 may be less than the access time of storage device 170. Accordingly, relative to cache memory 160, storage device 170 may be referred to as higher latency memory device. In addition, cache memory 160 may be a relatively smaller memory device compared to storage device 170, i.e., the storage capability or capacity of cache memory 160 may be less than the storage capability of storage device 170.

Cache memory 160 may be a volatile or a nonvolatile memory capable of storing software instructions and/or data. For example, in some embodiments, cache memory 160 may be a volatile memory such as, for example, a static random access memory (SRAM) or a dynamic random access memory (DRAM), although the scope of the present invention is not limited in this respect. In alternate embodiments, cache memory 160 may be a nonvolatile memory.

Storage device 170 may be a volatile or a nonvolatile memory capable of storing software instructions and/or data. Examples of nonvolatile memories include, but are not limited to, an electrically programmable read-only memory (EPROM), an electrically erasable and programmable read only memory (EEPROM), a flash memory (NAND and NOR types, including multiple bits per cell). Storage device 170 may also be a disk memory such as, for example, a floppy disk, an electromechanical hard disk, an optical disk, or a magnetic disk. Other types of nonvolatile memory are also within the scope of the present invention, including volatile memory with a battery backup, as the battery may prevent the memory from losing its contents when the main power source is off.

In the embodiment illustrated in FIG. 1, cache memory 160 may operate as a cache or disk cache for storage device 170. As illustrated above, cache memory 160 may be a relatively smaller and faster type of memory device compared to storage device 170. Cache memory 160 may cache information with a high probability of access by clients 110 and 120. As an example, cache memory 160 may cache frequently accessed or most recently accessed data from storage device 170 during operation of computing system 100, although the scope of the present invention is not limited in this respect. As data is requested from storage device 170, it may be available in cache memory 160, thereby avoiding a relatively longer search and fetch in storage device 170. Therefore, overall system performance may be improved by caching data in cache memory 160. As discussed above, in some embodiments, cache memory 160 may be a nonvolatile memory, thereby allowing retention of the cache data during a loss of power.

As discussed above, in one embodiment, clients 110 and 120 may share use of cache memory 160. Although only two clients are shown in the embodiment illustrated in FIG. 1, this is not a limitation of the present invention. In other embodiments, multiple clients may be coupled to and share cache memory 160.

In one embodiment, cache memory 160 may be a single cache memory and clients 110 and 120 may each be processors fetching instructions from cache memory 160. Cache memory 160 may be a direct mapped cache. Although a direct mapped cache is discussed herein, the methods and apparatuses to share a cache memory discussed herein may be extended to other categories of cache organization, e.g., extended to work with N-way set associative caches.

In one embodiment, an apparatus and method to share cache memory 160 may include dynamically partitioning cache memory 160 to cache data for one or more active clients during operation of cache memory 160, wherein the number of active clients may vary during operation of cache memory 160 between one active client to N active clients. In the embodiment illustrated in FIG. 1, two clients, i.e., clients 110 and 120, are illustrated and may be considered to be active or inactive at different points in time.

In one embodiment, control 130 may be adapted to allow access to a first portion of cache memory 160 by client 110 and adapted to allow access to a second different portion of cache memory 160 by client 120. Allocation or partitioning of cache memory 160 may be based on a "fair" policy. For example, if both clients 110 and 120 are active, each may get use of an equal portion of cache memory 160. If client 110 is active and client 120 is inactive, then control 130 may allow client 110 use of the whole cache memory 160.

Control 130 may also dynamically partition the use of cache memory 160 as the number of active clients varies over time. After varying the number of clients, the dynamic partitioning of cache memory 160 may include preserving data of the active clients in cache memory 160. In one example, both clients 110 and 120 are active and the use of cache memory 160 is equally divided so that client 110 has data cached in half of cache memory 160 and client 120 has data cached in the other half of cache memory 160. Then, if client 120 becomes inactive, active client 110 may obtain use of the entire cache and any data cached in the half of cache memory 160 by client 110 may be preserved after transitioning client 120 from active to inactive operation.

Figure 2:
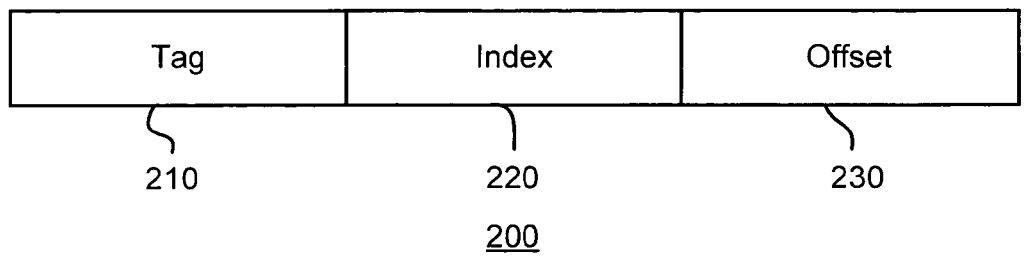
FIG. 2 illustrates an address in accordance with an embodiment of the present invention.

The clients may use an address to access information from cache memory 160 or storage device 170. FIG. 2 illustrates an address 200 that may be used to access information from a particular location in cache memory 160 or storage device 170. Address 200 may have a tag portion 210, a set index portion 220, and an offset portion 230. Although the scope of the present invention is not limited in this respect, in this embodiment, address 200 may be a 32-bit address, wherein tag 210 is Addr[31:13], set index 220 is Addr[12:6], and offset 230 is Addr[5:0].

Figure 3:
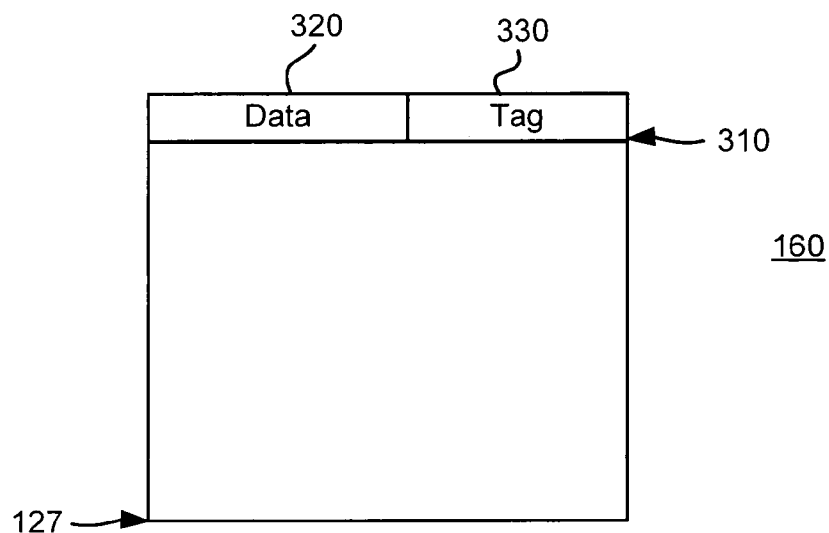
FIG. 3 illustrates a cache memory in accordance with an embodiment of the present invention.

FIG. 3 shows an example of how information may be stored in cache memory 160. Although the scope of the present invention is not limited in this respect, in this embodiment, cache memory 160 includes 128 lines numbered "0" through "127." Each line of cache memory 160 may include 64 bytes of information, which makes cache memory 160 an 8 kilobyte (KB) cache in this example.

For simplicity, only one cache line 310 is illustrated in FIG. 3. Cache line 310 may include a data portion 320 and a tag portion 330.

Referring to FIGS. 1–3, as an example, assume only one client is active, e.g., client 110 is active, and client 120 is inactive. Active client 110 may provide address 200 to control 130 to request information stored in cache memory 160. During this operation, control 130 may use all seven bits of set index 220 (Addr[12:6]) to allow active client 110 access to all 128 lines of cache memory 160. If active client 110 sends a set index 220 of '0000000' to control 130, then control 130 may allow active client 110 to access line "0" of cache memory 160. If active client 110 sends a set index 220 equal to '1111111', then control 130 may allow active client 110 to access line "127" of cache memory 160.

Partitioning cache memory 160 between multiple clients may include assigning client identifiers to each client. For example, control 130 may assign client identifiers '0' and '1' to clients 110 and 120. Control 130 may partition accessing of cache memory 160 by using client identifiers with set index 220 (Addr[12:6]). Thus, cache memory 160 may be indexed differently, depending on the number of active clients.

As an example, if both clients 110 and 120 are active, then control 130 may use the client identifier as the high bit or most significant bit of set index 220, i.e., Addr[12]. The remaining 6 bits of set index 220, i.e., Addr[11:6], may be used to address cache memory 160.

For example, if both clients 110 and 120 are active, control 130 may assign client identifier '0' to client 110 and client identifier '1' to client 120. If active client 110 sends a set index 220 equal to '1111111', then control 130 may combine set index 220 with client identifier '0' to generate a set index of '0111111', thereby allowing active client 110 to access line "63" of cache memory 160. Similarly, if active client 120 sends a set index 220 equal to '0000000', then control 130 may combine set index 220 with client identifier '1' to generate a set index of '1000000', thereby allowing active client 120 to access line "64" of cache memory 160. As may be appreciated, using this approach to share cache memory 160 may allow active clients 110 and 120 to equally access half of cache memory 160, wherein active client 110 may access lines "0" through "63" and active client 120 may access lines "64" through "127" of cache memory 160.

Although sharing of cache memory 160 by two active clients was described in the previous example, this is not a limitation of the present invention. More than two active clients may share cache memory 160 using a similar approach as was illustrated in the previous example. For example, assume there are four active clients, and in this example, control 130 may assign client identifiers '00', '01', '10', and '11' to the four active clients. Then, control 130 may use these client identifiers as the two highest bits of set index 220, i.e., Addr[12:11]. The remaining 5 bits of set index 220, i.e., Addr[10:6] may be used to address cache memory 160.

Returning to the previous example, wherein two active clients, e.g., active clients 110 and 120, share cache memory 160. In this example, to determine if there is a cache hit, tag 210 of address 200 may be compared to tag 330 stored in cache memory 160. If the value of tag 210 is equal to the value of tag 330, then this is a cache hit, and the data stored at line 310 may be returned to the client that sent the request. If tag 210 is not equal to tag 330, then this is a cache miss and the requested data may be retrieved from another memory, e.g., storage 170 using address 200. The data retrieved from storage 170 may be used to allocate a cache line in cache memory 160.

When a cache line is allocated, the tag for that line may be filled in with tag 210 and the client identifier of the active client. In this example, the tag may be used with the client identifier to determine if there is a cache hit or miss. Having redundant information in the tags may ensure that, regardless of transitions between one or more active clients, a cache line may not be improperly accessed.

In some embodiments, after transitioning from two active clients to one active client, the "warmed-up" or populated cache memory 160 may contain half its lines form one client and half its lines from the other client. If the tag stored in cache memory 160 includes the client identifier, then when one client becomes inactive, its data may still be in cache memory 160, but may not be accessed by the other client. This "old" data may be "aged out" of the cache as the active client allocates lines. The active client's set index may not be altered so that it can get to, on average, half of its old warmed-up lines. If the tag stored in cache memory 160 includes the client identifier, after transitioning from one client to two clients, the original active client may access, on average, half of its previously warm lines. Lines may survive multiple repartitions, even if their client is not continually active.

In the embodiment where the clients do not modify the cache, such as, for example, in an instruction cache, the above approaches may be sufficient for sharing cache memory 160. In alternate embodiments, if the clients modify the cache, steps may be taken to ensure that modified cache lines are properly handled so that the modifications stored in these lines are not lost or hidden from view when the modified lines become inaccessible to the client who modified them. There are various ways to do this, including, e.g., cleaning the entire cache memory, or cleaning a portion of the cache memory that has become inaccessible to the client that used to access it.

In one embodiment, cache memory 160 may be shared by dynamically partitioning cache memory 160 to cache data for one or more active clients during operation of cache memory 160, wherein the number of active clients may vary during operation of cache memory 160 between one active client to N active clients and wherein N is a power of two, although the scope of the present invention is not limited in this respect. In this embodiment, cache memory 160 may be used "fairly" by any active subset of N clients, provided the cardinality of the subset is also a power of two. If the number of active clients is not a power two, then some of cache memory 160 may be unused or wasted.

Using the notation lg(N) to mean log-base-2-of-N, the present invention may use control logic to select a set index from bits of an address and up to lg(N) client identifier bits. The tag for each line may include the lg(N) client identifier bits, as well as an extra lg(N) address bits.

If the number of clients is not a power of two, sharing of the cache memory can still be achieved without wasting any of the cache. For example, the number of clients bits may be CEILING(lg(N)), that is, the smallest integer greater than or equal to lg(N). And, one or more clients may be given larger blocks of the cache than others.

In one example, if there are three clients, then the client-part of the new index is 2 bits (CEILING(lg(3))), and the set index is formed differently for some clients. Client 0 may use a 0aaaaaa, where "aaaaaa" represents the six appropriate address bits from the address. Client 1 and client 2 may then use 10aaaaa and 11aaaaa, respectively, to form the set index. In this example of 3 clients, one client gets half the cache, and the other two each get a quarter of the cache.

As may be appreciated, an extension of this scheme may permit any number of clients to be supported, with 100% cache utilization, but may not be "fair" to each client.

In some of the embodiments described above, equal or "fair" sharing of a cache may be achieved and altering the number of active clients sharing a cache may be achieved. Sharing of the cache as described above may be used in multi-processor or multi-threaded clusters. Also, in the embodiments described above, support for keeping warm data or preserving data on repartitioning of a cache may be provided.

Figure 4:
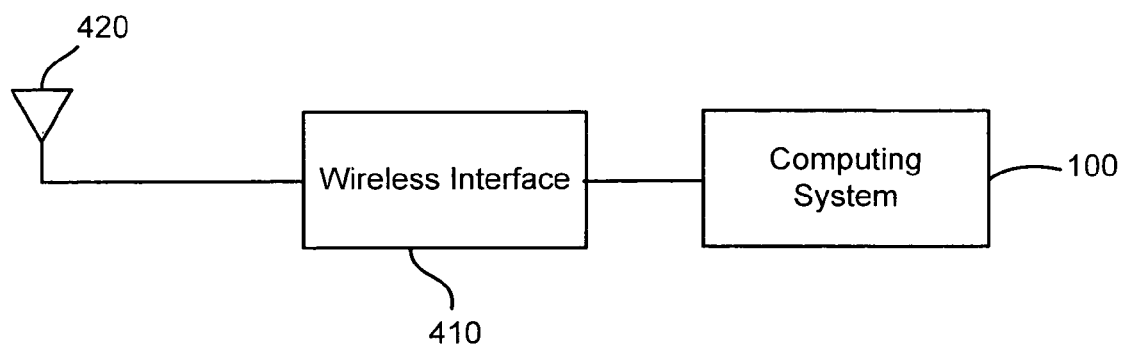
FIG. 4 is a block diagram illustrating a portion of a wireless device in accordance with an embodiment of the present invention.

FIG. 4 is a block diagram of a portion of a wireless device 400 in accordance with an embodiment of the present invention. Wireless device 400 may be a personal digital assistant (PDA), a laptop or portable computer with wireless capability, a web tablet, a wireless telephone, a pager, an instant messaging device, a digital music player, a digital camera, or other devices that may be adapted to transmit and/or receive information wirelessly. Wireless device 400 may be used in any of the following systems: a wireless local area network (WLAN) system, a wireless personal area network (WPAN) system, or a cellular network, although the scope of the present invention is not limited in this respect.

As shown in FIG. 4, in one embodiment wireless device 400 may include computing system 100, a wireless interface 410, and an antenna 420. Computing system 100 may include clients 110 and 120, control 130, cache memory 160, and storage device 170 that may operate as described herein.

In various embodiments antenna 420 may be a dipole antenna, helical antenna, global system for mobile communication (GSM), code division multiple access (CDMA), or another antenna adapted to wirelessly communicate information. Wireless interface 410 may be a wireless transceiver.

Although computing system 100 is illustrated as being used in a wireless device, this is not a limitation of the present invention. In alternate embodiments computing system 100 may be used in non-wireless devices such as, for example, a server, desktop, or embedded device not adapted to wirelessly communicate information.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method to share a cache memory, comprising:
partitioning a cache memory to cache data for one or more clients, wherein the number of clients varies over time; and
accessing the cache memory using an address having a tag portion, a set index portion, and an offset portion;
wherein said accessing includes accessing the cache memory using a client identifier included in the set index portion of the address.

2. The method of claim 1, wherein said partitioning includes dynamically partitioning the cache memory to cache data for at least two active clients during operation of the cache memory, wherein the number of active clients varies during operation of the cache memory between two active clients and N active clients.

3. The method of claim 2, wherein N is a power of two.

4. The method of claim 2, further including preserving data of active clients after varying the number of active clients.

5. The method of claim 2, wherein said partitioning includes partitioning the cache memory equally between the at least two active clients.

6. The method of claim 2, further comprising:
assigning a first client identifier to a first active client of the at least two active clients;
assigning a second client identifier to a second active client of the at least two active clients;
requesting information for the first active client by sending an address from the first active client;
comparing a value of a first portion of the address to a value of a tag stored at a location in the cache memory;
indicating a cache miss if the value of the first portion of the address is not equal to the value of the tag; and
responding to the cache miss by allocating a cache line of the cache memory with data from another higher latency memory, wherein said allocating includes storing the first client identifier in the cache line.

7. The method of claim 1, wherein at least one highest bits of the set index portion include the client identifier.

8. The method of claim 7, wherein at least one lowest bits of the set index include a portion of the address.

9. The method of claim 7, further comprising:
comparing the tag portion of the address to a stored tag located at a cache line in the cache memory corresponding to the set index portion and the client identifier, wherein the stored tag includes the client identifier; and
indicating a cache hit if a value of the stored tag is equal to a value of the tag portion of the address.

10. The method of claim 1, wherein said partitioning includes:
partitioning a cache memory to cache data for one or more active clients, wherein the number of active clients varies over time;
allowing use of the whole cache memory to one active client of the one or more active clients if the number of active clients is one;
allowing use of a first half of the cache memory by a first active client of the one or more active clients, if the number of active clients is two; and
allowing use of a second half of the cache memory by a second active client of the one or more active clients, if the number of active clients is two.

11. The method of claim 10, further comprising:
populating the first half of the cache memory with data for use by the first active client;
populating the second half of the cache memory with data for use by the second active client;
transitioning the second active client from active to inactive operation; and
preserving the data in the first half of the cache memory for use by the first active client after said transitioning.

12. The method of claim 1, wherein said partitioning includes:
assigning a client identifier to a first client of the one or more clients; and
allocating a cache line of the cache memory with data from another higher latency memory, wherein said allocating includes storing the client identifier in a tag of the cache line.

13. An apparatus, comprising:
a cache memory; and
a control device coupled to the cache memory, wherein the control device is adapted to allow use of the cache memory by one or more clients, the number of clients to vary over time;
wherein the control device is adapted to permit the clients to access the cache memory using an address having a tag portion, a set index portion including a client identifier, and an offset portion.

14. The apparatus of claim 13, wherein the control device is adapted to allow the number of clients to vary between one client and N clients.

15. The apparatus of claim 13, wherein the one or more clients are to be one or more transaction initiators.

16. The apparatus of claim 13, wherein the control device is adapted to allow access to a first portion of the cache memory by a first active client of the one or more clients and adapted to allow access to a second different portion of the cache memory by a second active client of the one or more clients.

17. The apparatus of claim 16, wherein the first portion is a first half of the cache memory and wherein the second portion is a second half of the cache memory.

18. The apparatus of claim 16, wherein the control device is adapted to assign a first client identifier corresponding to the first active client and adapted to assign a second client identifier corresponding to the second active client; and
wherein the control device is adapted to equally divide use of the cache memory between the first and second active clients during operation of the cache memory.

19. The apparatus of claim 13,
wherein the control device is adapted to assign a client identifier to a first active client of the one or more clients;
wherein the control device is adapted to receive an address from the first active client; and
wherein the control device is adapted to use the client identifier and the tag portion of the address to allow the first client to access a first portion of the cache memory.

20. The apparatus of claim 19,
wherein the control device is adapted to compare a value of a second portion of the address and a value of the tag stored at a cache line located at a location in the cache memory corresponding to the first portion of the address and the client identifier;

wherein the control device is adapted to indicate a cache miss if the value of the second portion of the address is not equal to the value of the tag; and wherein the control device is adapted to respond to the cache miss by allocating a cache line of the cache memory with data from another higher latency memory and wherein said allocating includes storing the client identifier in a tag of the cache line.

21. The apparatus of claim 13, wherein the cache memory is a direct mapped cache memory.

22. An article comprising a storage medium having stored thereon instructions, that, when executed by a computing platform, result in:

partitioning a cache memory to cache data for one or more clients, wherein the number of clients varies over time; and accessing the cache memory using an address having a tag portion, a set index portion, and an offset portion;

wherein said accessing includes accessing the cache memory using a client identifier included in the set index portion of the address.

23. The article of claim 22, wherein the instructions, when executed, further result in:

preserving data of active clients of the one or more clients after varying the number of active clients.

24. The article of claim 22, wherein if the number of clients is at least two clients, partitioning includes partitioning the cache memory equally between the at least two clients.

25. A system, comprising:

a wireless transceiver;

a cache memory coupled to the wireless transceiver; and a control device coupled to the cache memory, wherein the control device is adapted to allow use of the cache memory by one or more clients, wherein the number of clients is to vary over time;

wherein the control device is adapted to permit the clients to access the cache memory using an address having a tag portion, a set index portion including a client identifier, and an offset portion.

26. The system of claim 25, further comprising a dipole antenna coupled to the wireless transceiver.

27. The system of claim 25, wherein the control device is adapted to allow access to a first portion of the cache memory by a first active client of the one or more clients and adapted to allow access to a second different portion of the cache memory by a second active client of the one or more clients.

* * * * *